(12) United States Patent
Kihara

(10) Patent No.: US 9,298,246 B2
(45) Date of Patent: Mar. 29, 2016

(54) INFORMATION PROCESSING DEVICE, SYSTEM, AND INFORMATION PROCESSING METHOD

(71) Applicant: Yuka Kihara, Kanagawa (JP)

(72) Inventor: Yuka Kihara, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 145 days.

(21) Appl. No.: 14/143,105

(22) Filed: Dec. 30, 2013

(65) Prior Publication Data

US 2014/0204019 A1    Jul. 24, 2014

(30) Foreign Application Priority Data

Jan. 18, 2013  (JP) ................. 2013-007386

(51) Int. Cl.
G09G 5/00   (2006.01)
G06F 1/32   (2006.01)
G06F 3/03   (2006.01)

(52) U.S. Cl.
CPC .............. *G06F 1/3231* (2013.01); *G06F 1/325* (2013.01); *G06F 1/3287* (2013.01); *G06F 3/0304* (2013.01); *Y02B 60/1282* (2013.01); *Y02B 60/1289* (2013.01)

(58) Field of Classification Search
CPC ..... G06F 1/3231; G06F 1/325; G06F 3/0304; G06F 1/3287
See application file for complete search history.

(56) References Cited

U.S. PATENT DOCUMENTS

| 8,819,812 | B1* | 8/2014 | Weber et al. ............ 726/19 |
| 2008/0150968 | A1 | 6/2008 | Kihara |
| 2008/0304700 | A1 | 12/2008 | Kihara |
| 2009/0007019 | A1 | 1/2009 | Kobayashi et al. |
| 2009/0027337 | A1* | 1/2009 | Hildreth ................ 345/158 |
| 2009/0067747 | A1 | 3/2009 | Inamoto et al. |
| 2009/0074236 | A1 | 3/2009 | Kihara |
| 2009/0106699 | A1 | 4/2009 | Kihara et al. |
| 2009/0110300 | A1 | 4/2009 | Kihara et al. |
| 2009/0119583 | A1 | 5/2009 | Kihara et al. |
| 2009/0119585 | A1 | 5/2009 | Sakuyama et al. |
| 2009/0217211 | A1* | 8/2009 | Hildreth et al. ........... 715/863 |
| 2010/0067736 | A1 | 3/2010 | Kihara |
| 2011/0058228 | A1 | 3/2011 | Inamoto et al. |
| 2011/0164283 | A1 | 7/2011 | Sadasue et al. |
| 2011/0170122 | A1 | 7/2011 | Kihara et al. |
| 2011/0317871 | A1* | 12/2011 | Tossell et al. ............ 382/103 |
| 2012/0166934 | A1 | 6/2012 | Kihara |
| 2013/0321826 | A1* | 12/2013 | Chen et al. .............. 356/623 |
| 2014/0056472 | A1* | 2/2014 | Gu ..................... 382/103 |

FOREIGN PATENT DOCUMENTS

JP    4907483    1/2012

OTHER PUBLICATIONS

U.S. Appl. No. 13/915,752, filed Jun. 12, 2013.

* cited by examiner

*Primary Examiner* — Lixi C Simpson
(74) *Attorney, Agent, or Firm* — Oblon, McClelland, Maier & Neustadt, L.L.P.

(57) ABSTRACT

An information processing device includes: a first acquiring unit that acquires first information to be used for detecting whether a viewer is present around a display unit displaying an image from a first detector that detects the first information; a second acquiring unit that acquires second information to be used for recognizing an instruction action to the image displayed by the display unit from a second detector that detects the second information; and a deciding unit that decides a recognition method of the instruction action by using the second information, based on the first information acquired by the first acquiring unit.

13 Claims, 10 Drawing Sheets

INFORMATION PROCESSING DEVICE, SYSTEM, AND INFORMATION PROCESSING METHOD

CROSS-REFERENCE TO RELATED APPLICATIONS

The present application claims priority to and incorporates by reference the entire contents of Japanese Patent Application No. 2013-007386 filed in Japan on Jan. 18, 2013.

BACKGROUND OF THE INVENTION

1. Field of the Invention

The present invention relates to an information processing device, a system, and an information processing method.

2. Description of the Related Art

In fields of interactive digital signage and the like, systems for detecting changes of objects and persons and changing information that is presented interactively based on the changes attract attention. In the systems, for example, there has been known a method of changing information display in accordance with a non-contact action by a person's hand or the like so as to interest the person in the experience on the spot, and as a result, attract the interest to the presented information.

Furthermore, it is important for the signage to be viewed. There has been known devisal for detecting a position and an entrance direction of a person, changing an image display method, causing the person around the signage to recognize the signage as information presented to the person so as to attract the attention.

For example, Japanese Patent No. 4907483 discloses a technique of controlling display of an image based on comprehensive sensing information including a position, a direction, a sight line, a hand gesture (an action such as movement of a hand), and movement of a hand or an arm of a user (a viewer).

As a hypothesis of a purchasing behavior process, it is said that "attention" and "interest" trigger customer's positive behavior. That is to say, also in the field of the digital signage, interaction for "attracting interest" and interaction for "attracting attention of a person around the signage" are necessary. This needs not only detection of an action of a viewer to an image but also detection of the viewer present around a region in which the image is provided.

The technique disclosed in Japanese Patent No. 4907483, however, has the following problem. That is, a camera having high performance that senses an overall space at uniform resolution is used in order to detect global information such as the viewer's position and detect local information such as the free-hand gesture. Due to this, introduction of the device and the system requires the increased cost and the technique cannot be executed easily.

In view of the above-mentioned circumstance, there is a need to provide an information processing device, a system, and an information processing method that can realize a configuration for detecting global information such as a viewer's position at low cost.

SUMMARY OF THE INVENTION

It is an object of the present invention to at least partially solve the problems in the conventional technology.

An information processing device includes: a first acquiring unit that acquires first information to be used for detecting whether a viewer is present around a display unit displaying an image from a first detector that detects the first information; a second acquiring unit that acquires second information to be used for recognizing an instruction action to the image displayed by the display unit from a second detector that detects the second information; and a deciding unit that decides a recognition method of the instruction action by using the second information, based on the first information acquired by the first acquiring unit.

A system includes a display device that displays an image, and an information processing device connected to the display device. The system includes: a first acquiring unit that acquires first information to be used for detecting whether a viewer is present around the display device from a first detector that detects the first information; a second acquiring unit that acquires second information to be used for recognizing an instruction action to the image displayed by the display device from a second detector that detects the second information; and a deciding unit that decides a recognition method of the instruction action by using the second information, based on the first information acquired by the first acquiring unit.

An information processing method includes: acquiring first information to be used for detecting whether a viewer is present around a display unit displaying an image from a first detector that detects the first information; acquiring second information to be used for recognizing an instruction action to the image displayed by the display unit from a second detector that detects the second information; and deciding a recognition method of the instruction action by using the second information, based on the first information acquired at the acquiring of the first information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of an information processing device, a system, and an information processing method according to the invention in detail with reference to the accompanying drawings. Although a projecting system is described as an example of a system to which the invention is applied in the following embodiments, the invention is not limited thereto.

First Embodiment

Figure 1:
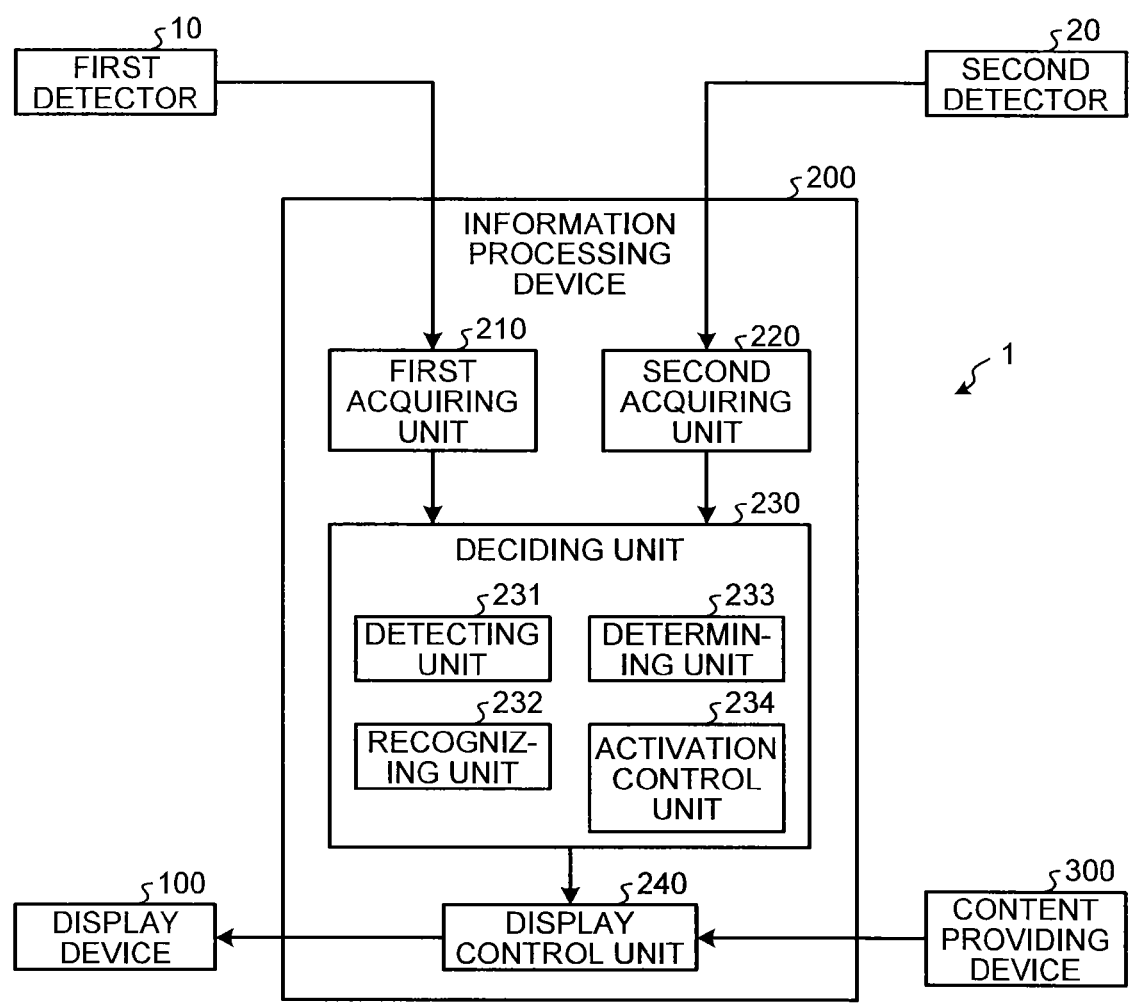
FIG. 1 is a diagram illustrating an example of the configuration of a projecting system according to a first embodiment.

FIG. 1 is a diagram illustrating an example of the configuration of a projecting system 1 according to the embodiment. As illustrated in FIG. 1, the projecting system 1 includes at least a display device 100 and an information processing device 200 that are connected to each other. Although the display device 100 is composed of a projector (an example of an image projecting device) for projecting an image onto a projection target material such as a wall surface in the embodiment, the display device 100 is not limited thereto. The display device 100 may be composed of a display device for displaying a signage image such an advertisement. In summary, it is sufficient that the display device 100 is a device for displaying an image. In this example, it can be grasped that the display device 100 corresponds to a "display unit" or a "display device" in the scope of the invention.

The information processing device 200 generates an image to be displayed on the display device 100 based on an image that is supplied from a content providing device 300, and outputs the generated image to the display device 100. Although the information processing device 200 is composed of a personal computer (PC) in the embodiment, the information processing device 200 is not limited thereto. Detailed contents of the information processing device 200 will be described later.

Figure 2:
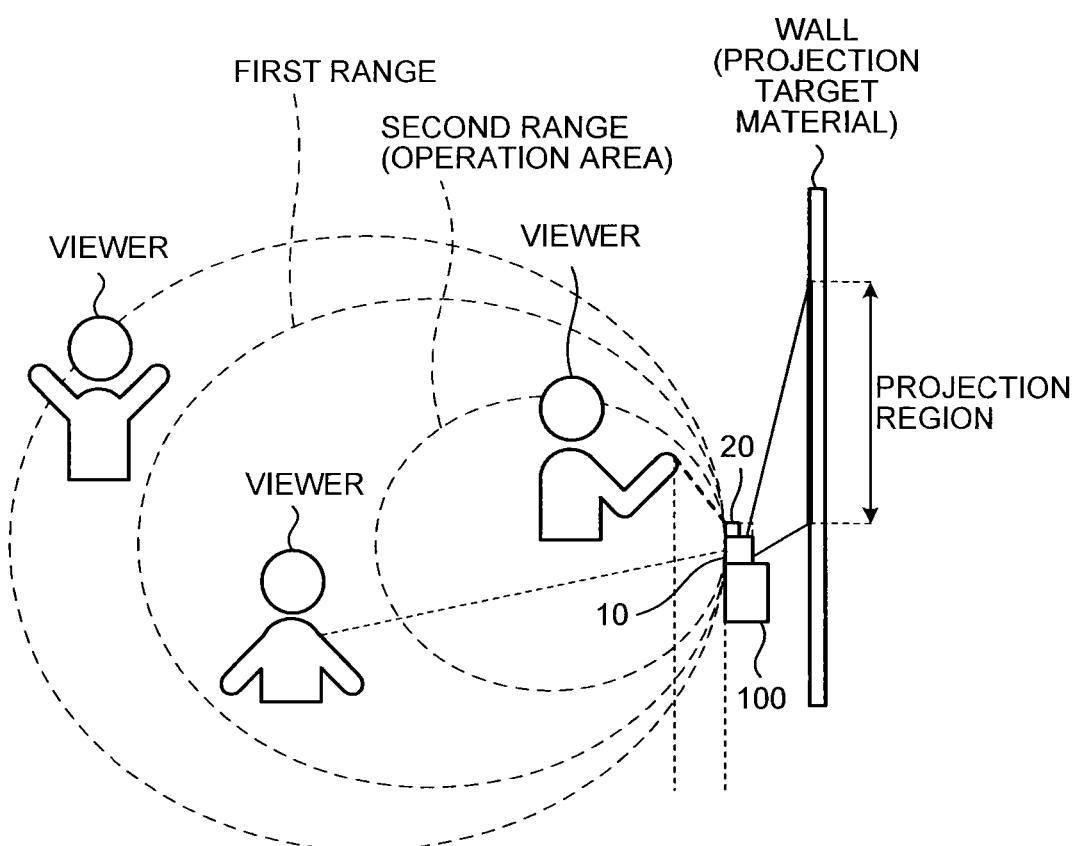
FIG. 2 is a view for explaining a first detector and a second detector.

In the embodiment, a first detector 10 and a second detector 20 are connected to the information processing device 200. To be more specific, as illustrated in FIG. 2, in the embodiment, the first detector 10 and the second detector 20 are attached to the upper part of the display device 100 configured as the projector.

The first detector 10 is a sensor for detecting first information that is used for detecting whether a viewer is present around the display device 100. Although a detection range of the first detector 10 corresponds to a first range indicating a range (range in which a projection image can be viewed) in which an image (in the following description, referred to as a "projection image" in some cases) that is projected onto the projection target material can be provided in the example of FIG. 2, the detection range of the first detector 10 is not limited thereto. In the following description, a region of the projection target material onto which the image is projected is referred to as a projection region in some cases. It is sufficient that the first detector 10 can detect a human body within a certain distance. The first detector 10 is preferably an inexpensive and small-sized infrared distance sensor that is rich in variety but it is not limited thereto. Note that when the infrared distance sensor is used as the first detector 10, it can detect only a local region generally. Therefore, a plurality of sensors arranged longitudinally and/or laterally may be used in accordance with a size of an area of a detection target. In this example, the first information indicates output of the infrared distance sensor.

The second detector 20 is a sensor for detecting second information that is used for recognizing an instruction action (for example, action of moving the hand) to an image (in this example, projection image) displayed by the display device 100. Although a preferable sensor is different depending on installation environment or the instruction action of a recognition target, it is sufficient that the second detector 20 has a function of capturing an image of an operation area (second range in FIG. 2) in which the viewer is expected to perform the instruction action around the display device 100. Although the second detector 20 is configured by a monocular camera as an example in the following description, the second detector 20 is not limited thereto and may be configured by an infrared camera, for example. The second detector 20 is set such that the operation area is in an angle of view thereof. In this example, the second information indicates output of the monocular camera, that is, image data obtained by capturing an image of the operation area.

For example, many small-sized, light-weight cameras for mobile cameras are on the market and are very inexpensive, so that these cameras can be used as the second detector 20. It is, however, preferable that the second detector 20 have an angle of view and resolution in accordance with the operation area and have a high frame rate (for example, approximately 30 fps) because it also gives influence on responsiveness of recognition of the instruction action.

Returning to FIG. 1, the following describes detailed contents of the information processing device 200. As illustrated in FIG. 1, the information processing device 200 includes a first acquiring unit 210, a second acquiring unit 220, a deciding unit 230, and a display control unit 240. The first acquiring unit 210 has a function of acquiring the first information from the first detector 10. The second acquiring unit 220 has a function of acquiring the second information from the second detector 20.

The deciding unit 230 decides a recognition method of an instruction action by using the second information acquired by the second acquiring unit 220, based on the first information acquired by the first acquiring unit 210. To be more specific, the deciding unit 230 includes a detecting unit 231, a recognizing unit 232, a determining unit 233, and an activation control unit 234.

The detecting unit 231 has a function of detecting whether a viewer is present around the display unit by using the first information acquired by the first acquiring unit 210. The detecting unit 231 has a function of calculating a distance between a position of the detected viewer and a display region (in this example, projection region) of an image displayed by the display device 100. In this example, the detecting unit 231 detects whether a viewer enters a first range in the following manner. That is, when the first detector 10 is installed, the detection range (first range) of the first detector 10 and a default value indicating distance information from the first detector 10 are stored in a memory (not illustrated). The detecting unit 231 compares the default value and the first information acquired by the first acquiring unit 210. It is to be noted that the methods of detecting the viewer and calculating the distance are not limited thereto and known various techniques can be applied (for example, paragraphs 0014 to 0015 in Japanese Patent Application Laid-open No. 2007-133305). In this example, the first detector 10 is arranged at a position that is sufficiently close to the projection region and it is considered that the distance between the projection region and the viewer can be approximated by the distance between the first detector 10 and the viewer.

The recognizing unit 232 has a function of recognizing the instruction action by using the second information acquired by the second acquiring unit 220. In the embodiment, the recognizing unit 232 detects motion of a recognition target (for example, a person's hand) images of which are captured in image data (second information) obtained by capturing images of the operation area by an interframe difference method, a background difference method, or the like. Then, the recognizing unit 232 recognizes the instruction action based on the detected motion and a predetermined instruction action recognition condition (information in which a motion of the recognition target and a type of an instruction action are associated). It is to be noted that known various techniques (for example, technique disclosed in Japanese Patent Application Laid-open No. 2009-64199) can be applied as the recognition method of the instruction action. Furthermore, when images of a plurality of recognition targets are captured in the image data (second information) obtained by capturing an image of the operation area, the recognizing unit 232 can specify a recognition target as a target of processing of recognizing the instruction action in accordance with a position of the viewers detected by the detecting unit 231 so as to execute the processing of recognizing the instruction action.

The determining unit 233 has a function of determining whether recognition of the instruction action is executable in accordance with the position of the viewer detected by the detecting unit 231. To be more specific, the determining unit 233 determines whether a distance D between the position of the viewer in the first range and the projection region that has been calculated by the detecting unit 231 is smaller than a threshold. When it is determined that the distance D is smaller than the threshold, the determining unit 233 determines that the recognition of the instruction action is to be executed. Then, the determining unit 233 activates the second detector 20 and performs control to execute acquisition processing by the second acquiring unit 220 and recognizing processing by the recognizing unit 232.

The activation control unit 234 has a function of performing control to activate the first detector 10 and the second detector 20. In addition, the activation control unit 234 also has a function of performing control to stop the first detector 10 and the second detector 20.

The display control unit 240 controls an image that is displayed on the display device 100 in accordance with a processing result by the deciding unit 230. For example, when the detecting unit 231 detects that the viewer is present in the first range, the display control unit 240 may perform control to display an image of an operation icon. To be more specific, the display control unit 240 generates an image by superimposing the image of an operation icon on the image that is supplied from the content providing device 300 and outputs the generated image to the display device 100. Furthermore, for example, when the recognizing unit 232 recognizes the instruction action, the display control unit 240 may perform control to display an image in accordance with the recognized instruction action. For example, the display control unit 240 may transition the image that is supplied from the content providing device 300 (in other words, may perform screen transition) in accordance with the recognized instruction action, and output the transitioned image to the display device 100. In this manner, feedback to the instruction action is executed.

Figure 3:
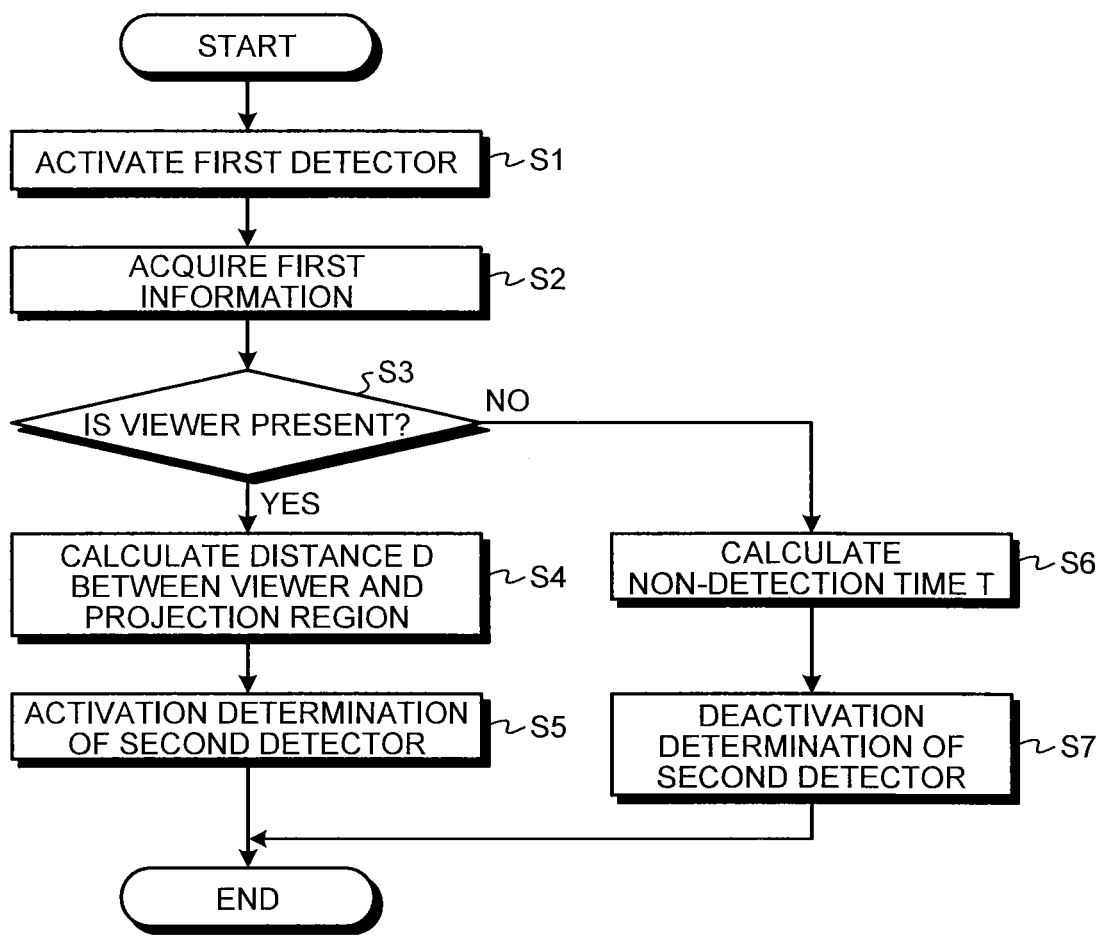
FIG. 3 is a flowchart illustrating an example of operation of an information processing device in the first embodiment.

Next, described is an example of operation of the information processing device 200 in the embodiment. FIG. 3 is a flowchart illustrating the example of the operation of the information processing device 200. As illustrated in FIG. 3, first, the activation control unit 234 performs control to activate the first detector 10 (step S1). Then, the first acquiring unit 210 starts processing of acquiring the first information indicating output of the first detector 10 so as to acquire the first information from the first detector 10 at a predetermined cycle (step S2). Thereafter, the detecting unit 231 detects whether the viewer is present in the first range from the first information acquired at step S2 (step S3).

When the detecting unit 231 detects that the viewer is present in the first range (Yes at step S3), the detecting unit 231 calculates the distance D between the detected viewer and the projection region (step S4). Next, the determining unit 233 executes activation determination processing of the second detector 20 (step S5).

Figure 4:
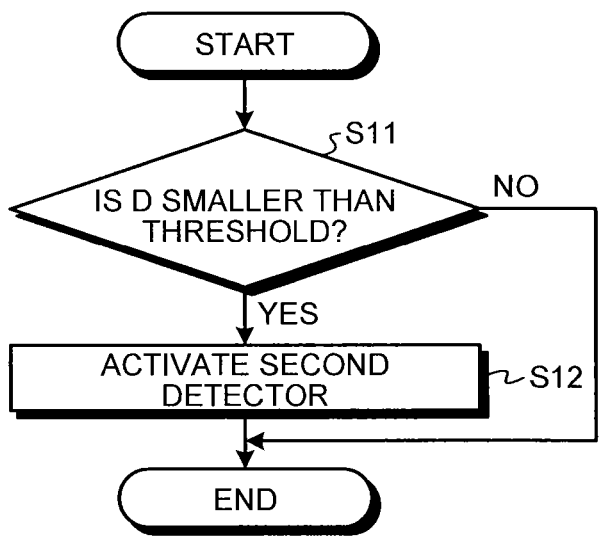
FIG. 4 is a flowchart illustrating an example of activation determination processing.

FIG. 4 is a flowchart illustrating an example of the activation determination processing that is executed by the determining unit 233. As illustrated in FIG. 4, first, the determining unit 233 determines whether the distance D calculated at the above-mentioned step S4 is smaller than a threshold (step S11). When the determining unit 233 determines that the distance D is smaller than the threshold (Yes at step S11), the determining unit 233 directs the activation control unit 234 to activate the second detector 20 (step S12). At the same time, the determining unit 233 directs the second acquiring unit 220 to start processing of acquiring the second information from the second detector 20 at a predetermined cycle and directs the recognizing unit 232 to start processing of recognizing the instruction action.

Description is continued with reference back to FIG. 3. When the detecting unit 231 detects that the viewer is not present in the first range at the above-mentioned step S3 (No at step S3), the detecting unit 231 calculates a non-detection time T indicating time during which the viewer is not detected to be present (step S6). Then, the determining unit 233 executes deactivation determination processing of the second detector 20 (step S7).

Figure 5:
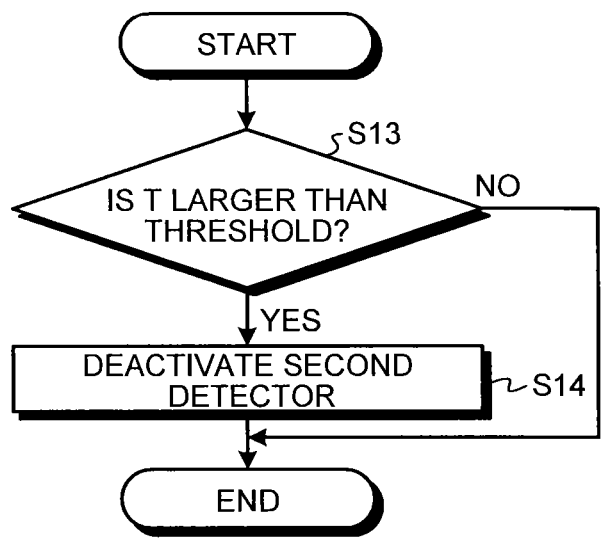
FIG. 5 is a flowchart illustrating an example of deactivation determination processing.

FIG. 5 is a flowchart illustrating an example of the deactivation determination processing that is executed by the determining unit 233. As illustrated in FIG. 5, first, the determining unit 233 determines whether the non-detection time T calculated at the above-mentioned step S6 is larger than a threshold (step S13). When the determining unit 233 determines that the non-detection time T is larger than the threshold (Yes at step S13), the determining unit 233 directs the activation control unit 234 to stop (deactivate) the second detector 20 (step S14). At the same time, the determining unit 233 directs the second acquiring unit 220 to stop the processing of acquiring the second information from the second detector 20 at the predetermined cycle and directs the recognizing unit 232 to stop the processing of recognizing the instruction action.

As described above, in the embodiment, the recognition method of the instruction action by using the second information acquired from the second detector 20 is decided based on the first information acquired from the first detector 10. Note that the second detector 20 detects the second information to be used for recognizing the instruction action to an image displayed by the display device 100 and the first detector 10 detects the first information to be used for detecting whether the viewer is present around the display device 100. To be specific, it is determined whether the recognition of the instruction action is executable in accordance with the position of the viewer detected by using the first information (in accordance with the distance D between the position of the viewer and the projection region). Then, when the distance D is smaller than the threshold, the second detector 20 that acquires the second information is stopped and the processing of acquiring the second information and the processing of recognizing the instruction action in the operation area are stopped (the processing of recognizing the instruction action is stopped).

On the other hand, in the conventional configuration in which the position of the viewer and the instruction action are recognized based on only the output from the camera that senses an overall space at uniform resolution, there are the following problems. That is, the camera has high performance, resulting in increase of the introduction cost of the system. In addition, power consumption is increased because power necessary for sensing needs to be kept regardless of presence and absence of the viewer (power necessary for sensing cannot be reduced even when the viewer is not present). In contrast, the camera having high performance is not needed in the embodiment, thereby making it possible to suppress the introduction cost of the system. Furthermore, in the embodiment, when the position of the viewer corresponds to a position at which the instruction action is not expected to be performed, the second detector 20 is stopped and the processing of recognizing the instruction action is stopped. This can reduce the power consumption in comparison with that in the conventional configuration. Accordingly, the embodiment exhibits an advantageous effect of reducing the cost and the power consumption in comparison with those in the conventional configuration.

Second Embodiment

Next, described is a second embodiment. The second embodiment is different from the first embodiment in a point that a system in the second embodiment has a function of setting a load ratio between the processing of detecting whether the viewer is present in the first range (processing by the first acquiring unit 210 and the detecting unit 231) and the processing of recognizing the instruction action in the operation area (processing by the second acquiring unit 220 and the recognizing unit 232) variably in accordance with the position of the viewer present in the first range. Furthermore, the second embodiment is different from the above-mentioned first embodiment also in a point that the system in the second embodiment has a function of setting a parameter to be used for recognizing the instruction action by the recognizing unit 232 variably in accordance with the position of the viewer present in the first range. The following describes the differences in detail. It is to be noted that the same reference numerals denote elements common to those in the above-mentioned first embodiment and description thereof is omitted appropriately.

Figure 6:
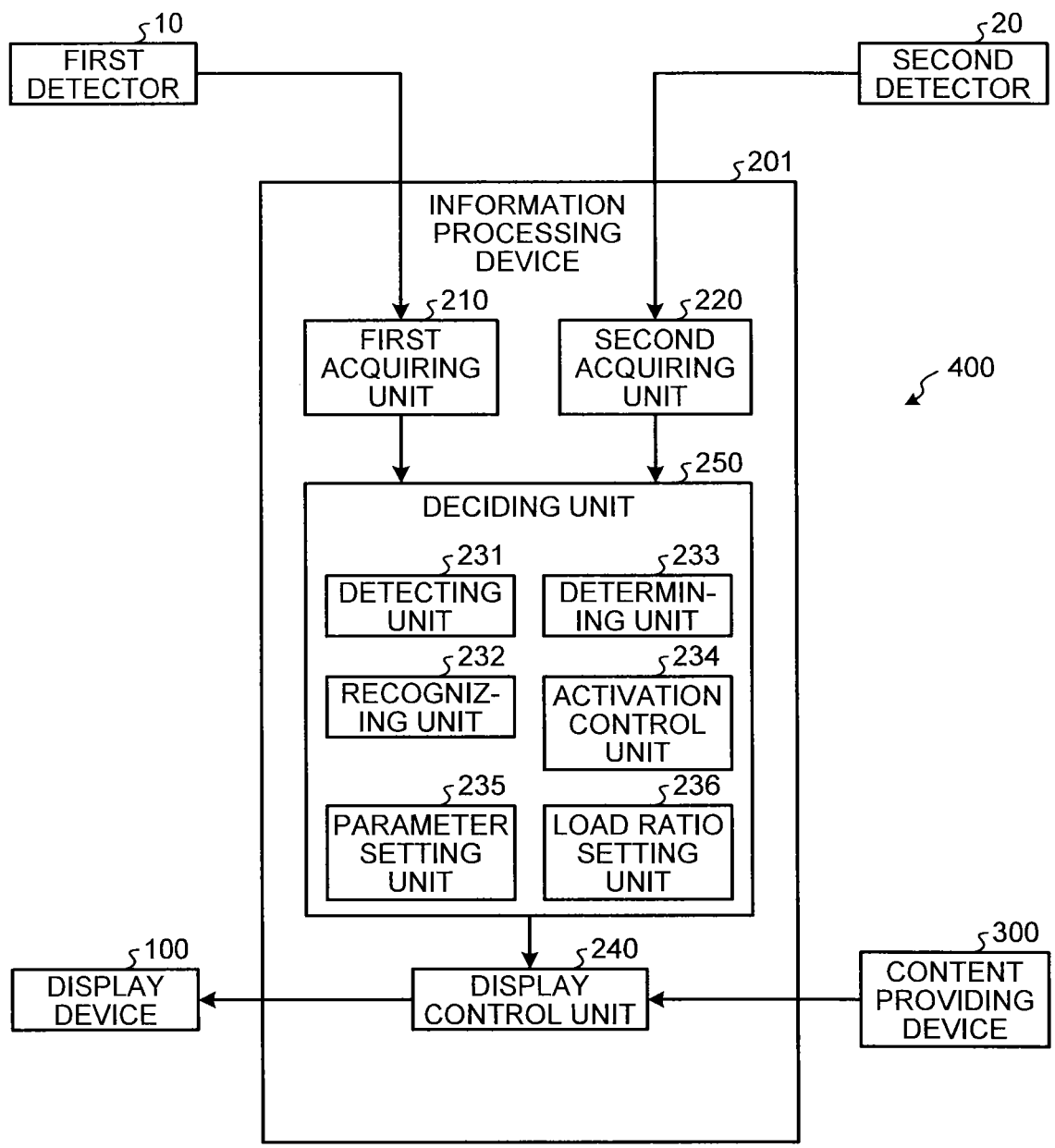
FIG. 6 is a diagram illustrating an example of the configuration of a projecting system according to a second embodiment.

FIG. 6 is a diagram illustrating an example of the configuration of a projecting system 400 according to the second embodiment. A part of function of a deciding unit 250 included in an information processing device 201 in the projecting system 400 is different from that in the above-mentioned first embodiment. The following mainly describes points different from the first embodiment. As illustrated in FIG. 6, the deciding unit 250 is different from the deciding unit in the above-mentioned first embodiment in a point that the deciding unit 250 further includes a parameter setting unit 235 and a load ratio setting unit 236.

The parameter setting unit 235 sets a parameter to be used for recognizing the instruction action by the recognizing unit 232 (processing of recognizing the instruction action) variably in accordance with the position of the viewer detected by the detecting unit 231. Hereinafter, detail description thereof is made.

In the processing of recognizing the instruction action, when the recognition target of the instruction action such as the viewer's hand is extracted from the second information (image data obtained by capturing images of the operation area), the following method is employed in some cases. That is, employed is a method of determining whether it is the recognition target or noise by comparing an area of a region indicating an interframe differential and a threshold. The area of a captured image of the viewer's hand (an example of the recognition target) in the image data captured by the monocular camera (second detector 20) installed at a predetermined position is expected to be largely different depending on the positions of the viewers. Based on this, positional information of the viewer, in particular, information indicating a distance from the second detector 20 to a place at which the viewer is present is important to set an appropriate threshold.

Then, the parameter setting unit 235 sets an area threshold (example of the parameter) to be used for the processing of recognizing the instruction action variably in accordance with the position of the viewer in the first region that has been detected by the detecting unit 231. In this example, a distance between the position of the viewer detected by the detecting unit 231 and the second detector 20 can be approximated by the distance between the position of the viewer and the first detector 10. For example, it is assumed that a reference value Dx of the distance between the viewer and the second detector 20 (first detector 10) and a reference value S of an area for a threshold are given. In this case, an estimated area S' can be expressed by the following equation 1 for the distance D calculated by the detecting unit 231. In the processing of recognizing the instruction action, a differential image indicating an area smaller than the estimated area S' calculated in the equation 1 is determined to be noise.

$$S' = S \times Dx^2 / D^2 \quad \text{(Equation 1)}$$

Application of S' to the area for the threshold makes it possible to cope with even the case where the area of a captured image of the viewer's hand is different depending on the distances between the viewer and the second detector 20 robustly.

Figure 7:
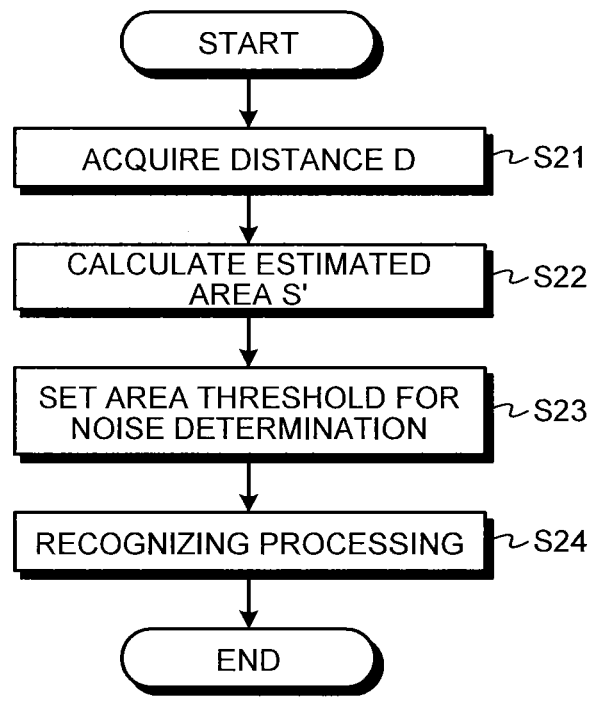
FIG. 7 is a flowchart illustrating an example of processing by a parameter setting unit.

FIG. 7 is a flowchart illustrating an example of the above-mentioned processing by the parameter setting unit 235. Here, it is based on the premise that every time the detecting unit 231 detects that the viewer is present in the first range from the first information acquired by the first acquiring unit 210, the detecting unit 231 calculates the distance D between the position of the viewer and the first detector 10 (second detector 20) and outputs the calculated distance D to the parameter setting unit 235.

As illustrated in FIG. 7, first, the parameter setting unit 235 acquires the distance D calculated by the detecting unit 231 (step S21). The parameter setting unit 235 calculates the estimated area S' by using the above-mentioned equation 1 (step S22). Then, the parameter setting unit 235 sets the estimated area S' calculated at step S22 as an area threshold for noise determination (step S23). Thereafter, the recognizing unit 232 performs the processing of recognizing the instruction action by using the area threshold set at step S23 (step S24).

Returning to FIG. 6, description of the function of the parameter setting unit 235 is continued. In the processing of recognizing the instruction action, a method of extracting the recognition target such as the viewer's hand from the second information and using a trajectory of the extracted recognition target for the recognition of the instruction action is employed in some cases. That is to say, information (instruction action recognition condition) in which a predetermined trajectory is associated with each type of the instruction actions is prepared previously. When the trajectory of the extracted recognition target is identical to a predetermined trajectory in the instruction action recognition condition, it can be recognized that the instruction action corresponding to the predetermined trajectory has been performed.

Figure 8:
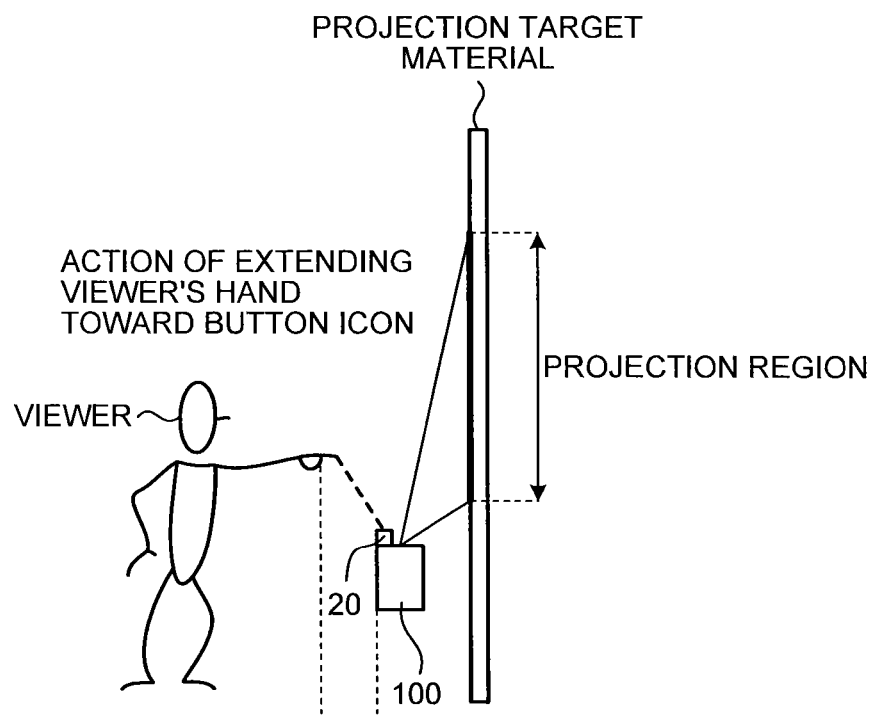
FIG. 8 is a view schematically illustrating a state where a viewer performs an instruction action of holding his(her) hand on an icon image such as a button that has been projected and displayed.

For example, as illustrated in FIG. 8, even with a simple instruction action of holding the viewer's hand on (extending the viewer's hand toward) the icon image such as the button that is displayed on the projection region, and so on, the trajectory of the captured images of the viewer's hand in the image data captured by the camera (second detector 20) is expected to be different depending on the positions of the viewer. Based on this, the positional information of the viewer, in particular, information indicating that the viewer is present at any of the left and right positions with respect to the second detector 20 is important to appropriately recognize the instruction action.

The parameter setting unit 235 sets the instruction action recognition condition (an example of the parameter) that is used for the processing of recognizing the instruction action variably in accordance with the position of the viewer in the first region that has been detected by the detecting unit 231. For example, the installation environment as illustrated in FIG. 8 is supposed. In this case, when the viewer is present on the right with respect to the second detector 20, a trajectory of "right→center→right" can be applied as a predetermined trajectory corresponding to the instruction action of extending the viewer's hand toward the button icon. On the other hand, when the viewer is present on the left, a trajectory of "left→center→left" can be applied as the predetermined trajectory corresponding to the instruction action of extending viewer's hand toward the button icon.

In this manner, the instruction action recognition condition that is used for the processing of recognizing the instruction action is set variably in accordance with the position of the viewer in the first region that has been detected by the detecting unit 231. This can cope with the difference in the trajectory drawn by the instruction action of the viewer depending on the position of the viewer (difference in the captured image depending on whether the viewer extends his(her) hand from the right or the left) robustly.

Figure 9:
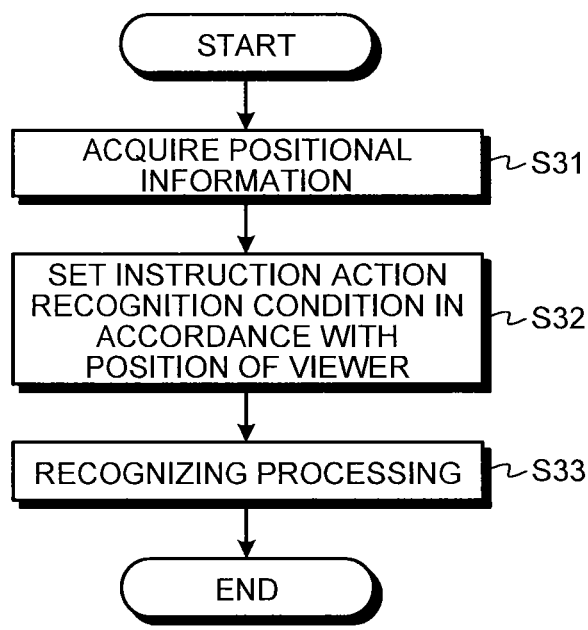
FIG. 9 is a flowchart illustrating an example of processing by the parameter setting unit.

FIG. 9 is a flowchart illustrating an example of the above-mentioned processing by the parameter setting unit 235. It is based on the premise that every time the detecting unit 231 detects that the viewer is present in the first range from the first information acquired by the first acquiring unit 210, the detecting unit 231 outputs positional information indicating the position of the viewer to the parameter setting unit 235.

As illustrated in FIG. 9, first, the parameter setting unit 235 acquires the positional information indicating the position of the viewer from the detecting unit 231 (step S31). The parameter setting unit 235 sets the instruction action recognition condition in accordance with the position of the viewer indicated by the positional information acquired at step S31 (step S32). Then, the recognizing unit 232 performs the processing of recognizing the instruction action by using the instruction action recognition condition set at step S32 (step S33).

Returning to FIG. 6 again, description of the functions of the parameter setting unit 235 is continued. The processing of recognizing the instruction action is performed by using a plurality of frames generally. In the processing of recognizing the instruction action, when a method of acquiring frames from the second detector 20 in accordance with load of a central processing unit (CPU) is employed, if performance of the CPU is low, frames are acquired in a skipping manner. This results in that recognition accuracy is lowered and a trouble also occurs on responsiveness speed.

In order to solve this, the parameter setting unit 235 sets a load ratio between the processing of detecting whether the viewer is present in the first range (processing by the first acquiring unit 210 and the detecting unit 231) and the processing of recognizing the instruction action that is performed in the operation area (second range) (processing by the second acquiring unit 220 and the recognizing unit 232) variably in accordance with the position of the viewer in the first region that has been detected by the detecting unit 231.

In the following description, for example, the load ratio of 60% indicates the ratio of the processing of recognizing the instruction action when the total of the ratio of the processing of detecting whether the viewer is present in the first range and the ratio of the processing of recognizing the instruction action that is performed in the operation area (second range) is set as 100%. That is to say, this case indicates that the ratio of the processing of detecting whether the viewer is present in the first range is 40%. As the load ratio of the processing of recognizing the instruction action is higher, the load of the processing by the second acquiring unit 220 and the recognizing unit 232 is increased. This also increases a frequency (frame rate) at which the frames (image data (second information) obtained by capturing images of the operation area) are acquired from the second detector 20.

Figure 10:
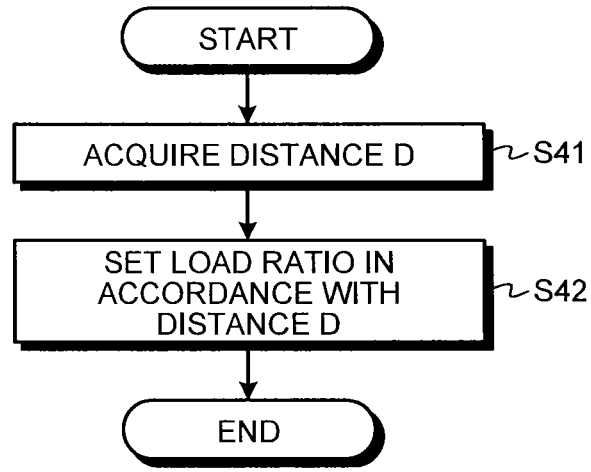
FIG. 10 is a flowchart illustrating an example of processing by the parameter setting unit.

FIG. 10 is a flowchart illustrating an example of the above-mentioned processing by the parameter setting unit 235. It is based on the premise that every time the detecting unit 231 detects that the viewer is present in the first range from the first information acquired by the first acquiring unit 210, the detecting unit 231 calculates the distance D between the position of the viewer and the projection region (first detector 10) and outputs the calculated distance D to the parameter setting unit 235.

As illustrated in FIG. 10, first, the parameter setting unit 235 acquires the distance D calculated by the detecting unit 231 (step S41). Next, the parameter setting unit 235 sets the load ratio in accordance with the distance D acquired at step S41 (step S42). In the embodiment, when the distance D is smaller than the threshold, the parameter setting unit 235 sets the load ratio to 80%. When the distance D is equal to or larger than the threshold, the parameter setting unit 235 sets the load ratio to 50%. Note that it is not limited thereto.

It is to be noted that the above-mentioned processing by the parameter setting unit 235 may be performed after the second detector 20 is activated or may be performed before the second detector 20 is activated.

As described above, also in the embodiment, the recognizing method of the instruction action by using the second information acquired from the second detector 20 is decided based on the first information acquired from the first detector 10. The embodiment can reduce the cost in comparison with the configuration in which the position of the viewer and the instruction action are recognized only based on the output of the camera having high performance that senses an overall space at uniform resolution. To be specific, in the embodiment, control to set the load ratio variably or to set the parameter that is used for recognizing the instruction action variably in accordance with the position of the viewer detected by using the first information acquired from the first detector 10 is performed.

Third Embodiment

Next, described is a third embodiment. The third embodiment is different from the above-mentioned respective embodiments in that when recognition of the instruction action is performed, even if a new viewer present in the first range is detected, an image that is displayed by the display device 100 is not controlled in accordance with the position of the new viewer. The following describes the differences in detail. It is to be noted that the same reference numerals denote elements common to those in the above-mentioned embodiments and description thereof is omitted appropriately.

Figure 11:
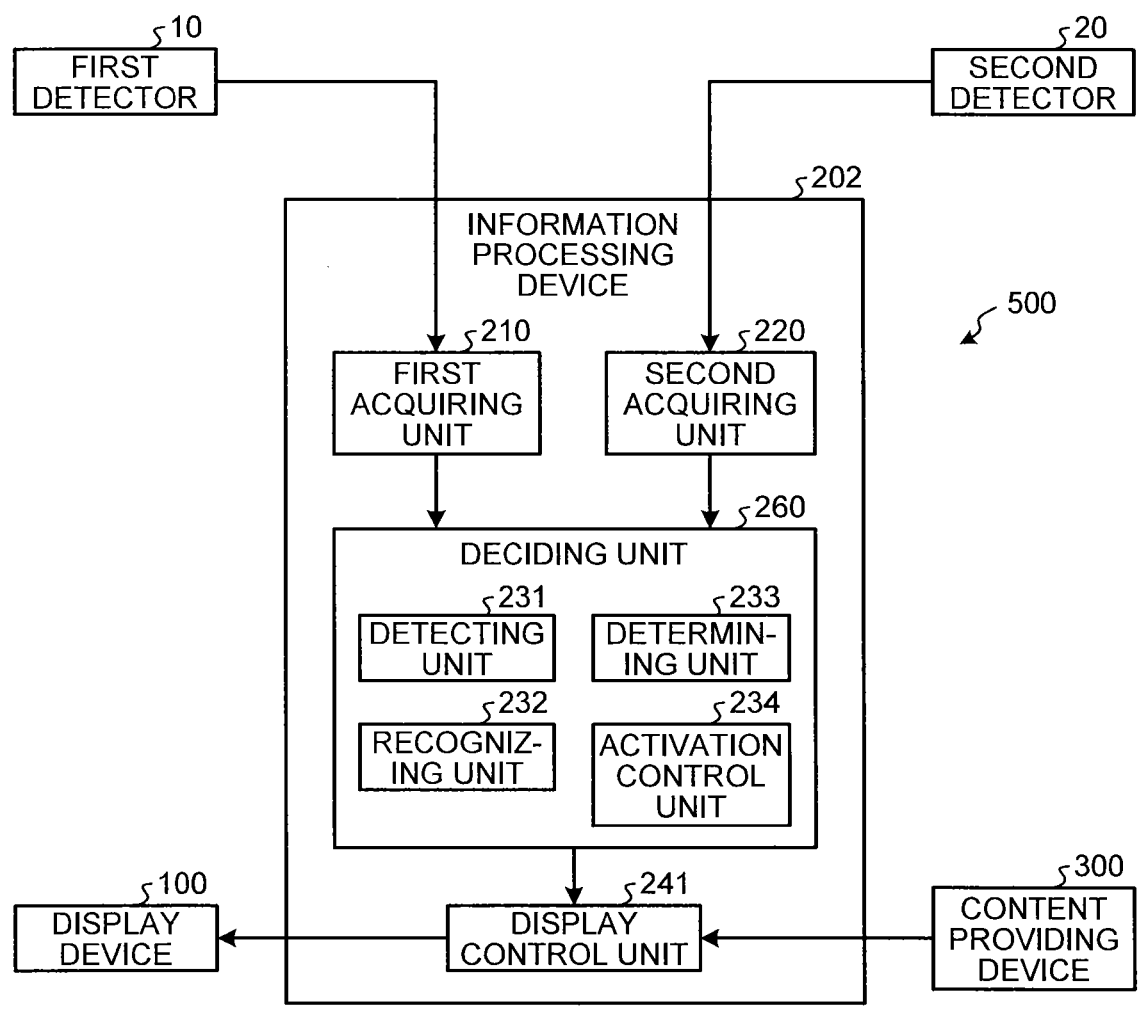
FIG. 11 is a diagram illustrating an example of the configuration of a projecting system according to a third embodiment.

FIG. 11 is a diagram illustrating an example of the configuration of a projecting system 500 according to the third embodiment. A part of the function of a display control unit 241 included in an information processing device 202 in the projecting system 500 is different from that in the above-mentioned first embodiment. The following mainly describes points different from the first embodiment. Although the configuration of a deciding unit 260 included in the information processing device 202 is the same as that in the first embodiment in the example as illustrated in FIG. 11, the configuration of the deciding unit 260 is not limited thereto. For example, the deciding unit 260 included in the information processing device 202 may have the same configuration as that in the second embodiment (configuration further including the parameter setting unit 235 and the load ratio setting unit 236).

As in the above-mentioned embodiments, the display control unit 241 performs control to switch display information in accordance with a result of the detection processing by the detecting unit 231, or a result of the processing of recognizing the instruction action by the recognizing unit 232. With this, the interaction for "attracting attention" to the display information and the interaction for "attracting interest" to the display information through an operation experience on a display screen (in this example, projection image) are executed.

As the example of the interaction for "attracting attention" to the display information, as described above, when it is detected that the viewer is present in the first range, it is considered that an operation ion (for example, objects such as operation buttons of display brightness and size) is controlled to be displayed. Furthermore, in the embodiment, the display control unit 241 performs brightness control of changing the brightness of the projection image in accordance with the position of the viewer detected by the detecting unit 231. To be more specific, the display control unit 241 performs control to change the brightness of a light source or change specified gradations of respective pixels contained in image data as a projection target in accordance with the distance D between the position of the viewer and the projection region (first detector 10) that has been calculated by the detecting unit 231.

Furthermore, when the non-detection time T (time during which the viewer is not detected to be present) calculated by the detecting unit 231 is equal to or larger than the threshold, the display control unit 241 performs control to switch display to mute. This can suppress power consumption of the display device 100.

Figure 12:
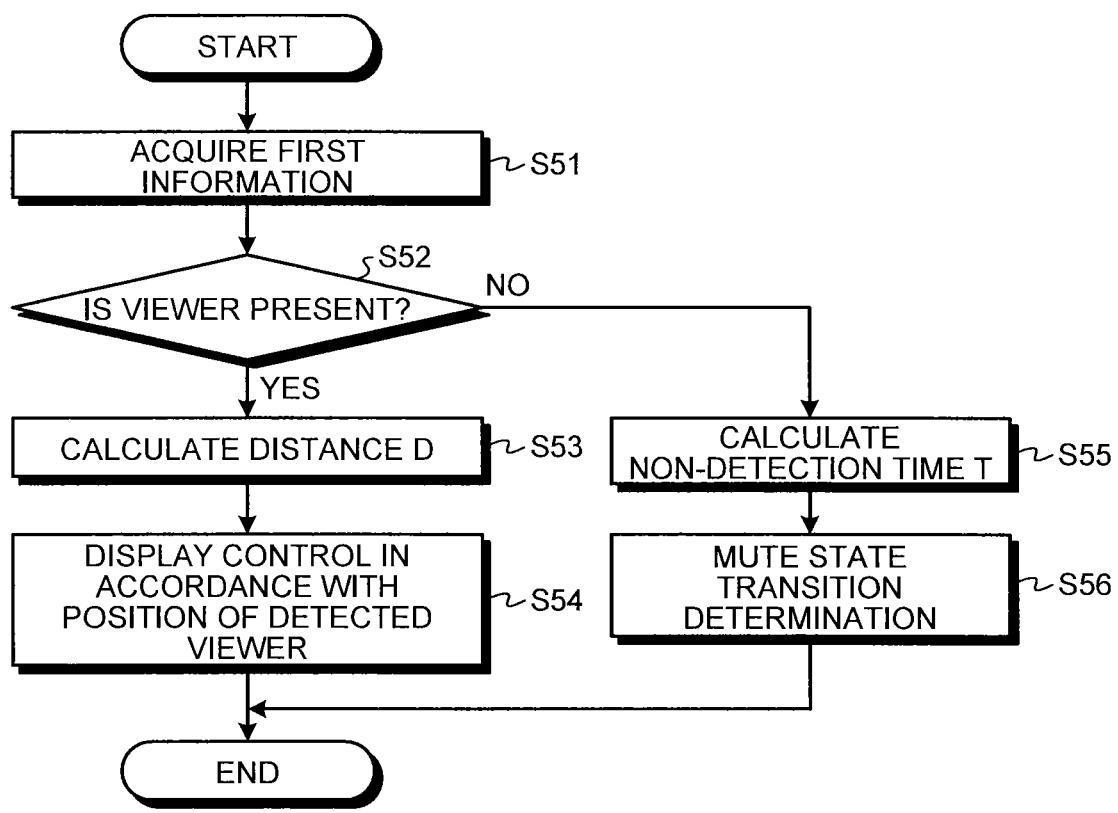
FIG. 12 is a flowchart illustrating an example of operation of the information processing device when interaction for "attracting attention" is performed on display information.

FIG. 12 is a flowchart illustrating an example of operation of the information processing device 202 when the interaction for "attracting attention" to the display information is performed. In this example, it is based on the premise that the first detector 10 has been already activated, and every time the detecting unit 231 detects that the viewer is present in the first range from the first information acquired by the first acquiring unit 210 at the predetermined cycle, the detecting unit 231 calculates the distance D between the position of the viewer and the projection region and outputs the calculated distance D to the display control unit 241. As illustrated in FIG. 12, first, the first acquiring unit 210 acquires the first information from the first detector 10 (step S51). Then, the detecting unit 231 detects whether the viewer is present in the first range from the first information acquired at step S51 (step S52). The processing at step S52 is performed every time the first acquiring unit 210 acquires the first information.

When the detecting unit 231 detects that the viewer is present in the first range (Yes at step S52), the detecting unit 231 calculates the distance D between the detected viewer and the projection region (step S53), and outputs the calculated distance D to the display control unit 241. Then, the display control unit 241 performs display control in accordance with the position of the viewer detected by the detecting unit 231 (step S54). To be more specific, the display control unit 241 performs control to display an operation icon and to change brightness of the projection image in accordance with the calculated distance D. For example, the display control unit 241 may perform control to increase the brightness of the projection image as the distance D is smaller.

On the other hand, at the above-mentioned step S52, when the detecting unit 231 detects that the viewer is not present in the first range (No at step S52), the detecting unit 231 calculates a non-detection time T indicating time during which the viewer is not detected to be present (step S55). Then, the detecting unit 231 outputs the calculated non-detection time T to the display control unit 241. Thereafter, the display control unit 241 executes mute state transition determination processing based on the non-detection time T (step S56). To be more specific, the display control unit 241 determines whether the non-detection time T is equal to or larger than a threshold. When the display control unit 241 determines that the non-detection time T is equal to or larger than the threshold, the display control unit 241 performs control to switch display to mute. When the display control unit 241 determines that the non-detection time T is smaller than the threshold, the display control unit 241 repeats the pieces of processing subsequent to step S51.

Description is continued with reference back to FIG. 11. As the example of the interaction for "attracting interest" to the display information through an operation experience on the display screen, as described above, when the instruction action is recognized by the processing of recognizing the instruction action, it is considered that screen transition is performed and a new content is presented to the viewer.

Independently performing display control in accordance with the result of the detection by the detecting unit 231 and display control in accordance with the result of the processing of recognizing the instruction action by the recognizing unit 232 can result in confusion. For example, when one viewer comes closer from far under the state where another viewer performs an instruction action on the display screen, there arises a problem such as generation of unintended display switch during the instruction action.

Figure 13:
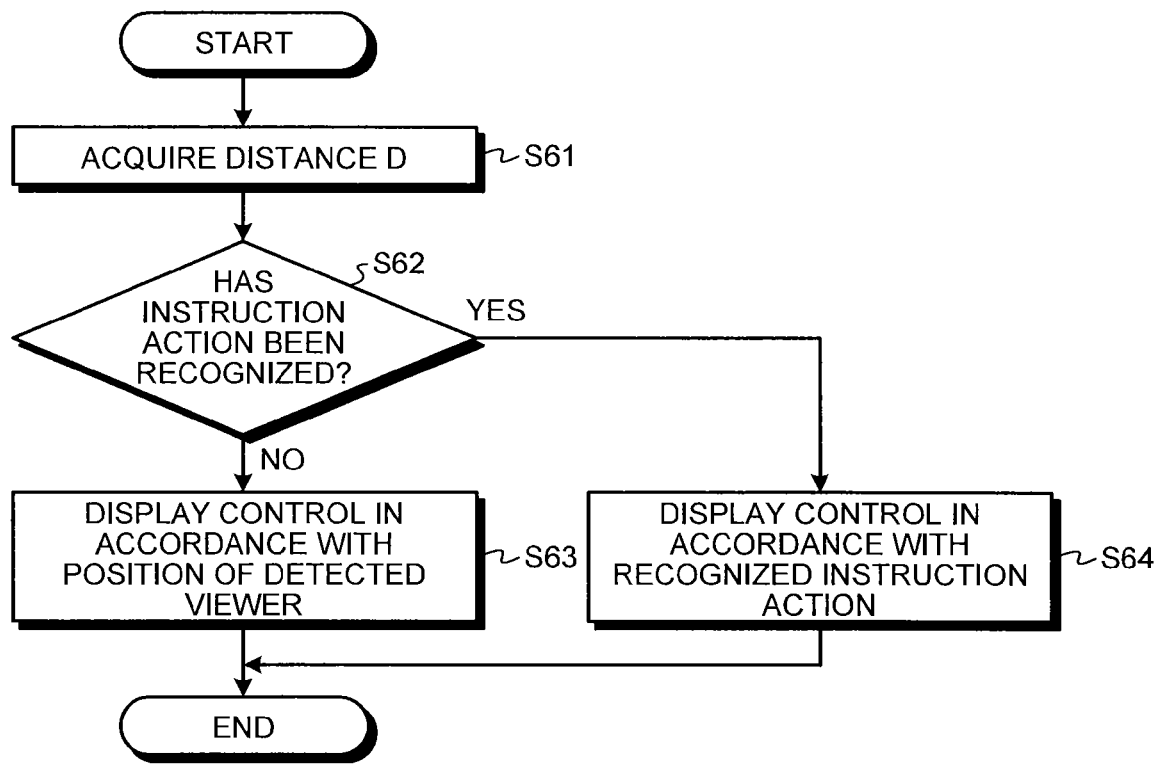
FIG. 13 is a flowchart illustrating an example of processing by a display control unit in the third embodiment.

As one point of view, it can be considered that a viewer concerning the display content at the most level is not a person standing therearound but a viewer that performs the instruction action. In the embodiment, when the recognizing unit 232 recognizes the instruction action (processing of recognizing the instruction action), even when the detecting unit 231 detects a new viewer present in the first range, the display control unit 241 does not control the projection image in accordance with the position of the new viewer. FIG. 13 is a flowchart illustrating an example of the processing by the display control unit 241 in the embodiment. In this example, it is based on the premise that every time the detecting unit 231 detects that the viewer is present in the first range from the first information acquired by the first acquiring unit 210 at the predetermined cycle, the detecting unit 231 calculates the distance D between the position of the viewer and the projection region and outputs information indicating the calculated distance D and information indicating that the presence of the viewer in the first range has been detected to the display control unit 241. When the recognition target of the instruction action (for example, person's hand) is extracted from the second information (image data obtained by capturing images of the operation area) acquired by the second acquiring unit 220 at the predetermined cycle, the recognizing unit 232 outputs the information to that effect to the display control unit 241. Then, it is based on the premise that when the instruction action corresponding to the trajectory of the extracted recognition target is recognized based on the above-mentioned instruction action recognition condition, the recognizing unit 232 outputs the instruction action information indicating the recognized instruction action to the display control unit 241.

As illustrated in FIG. 13, first, the display control unit 241 acquires the distance D calculated by the detecting unit 231 (step S61). Then, the display control unit 241 determines whether the recognizing unit 232 has recognized the instruction action (step S62). In this example, when the display control unit 241 acquires the information indicating that the recognition target has been extracted or the instruction action information from the recognizing unit 232, the display control unit 241 determines that the instruction action has been recognized. At step S62, when the display control unit 241 determines that the instruction action has not been recognized (No at step S62), the display control unit 241 performs display control in accordance with the position of the viewer detected by the detecting unit 231 (step S63). To be more specific, the display control unit 241 performs control to display an operation icon or performs control to change the brightness of the projection image in accordance with the calculated distance D. On the other hand, at step S62, when the display control unit 241 determines that the instruction action has been recognized (Yes at step S62), the display control unit 241 does not perform display control in accordance with the position of the viewer detected by the detecting unit 231 but performs display control in accordance with the instruction action recognized by the recognizing unit 232 (step S64).

In the information processing device (200, 201, 202) according to each of the above-mentioned embodiments, although an interaction function can be added to the display device 100 such as a projector, the interaction function is desirably integrated with the display device 100 in consideration of installation easiness. In addition, the sensors (first detector 10, second detector 20) are preferably incorporated in or unitized with the integrated device. The integrated device can be also grasped as an image display device that displays an image. That is to say, the invention can be also applied to such a display device.

As the hardware configuration of the information processing device (200, 201, 202) according to each of the above-mentioned embodiments, the hardware configuration of a normal computer device including a central processing unit (CPU), a read only memory (ROM), and a random access memory (RAM) is used. The functions of the respective units (first acquiring unit 210, second acquiring unit 220, detecting unit 231, recognizing unit 232, determining unit 233, activation control unit 234, parameter setting unit 235, load ratio setting unit 236, display control unit 240(241)) of the information processing device (200, 201, 202) are realized when the CPU executes a program stored in the ROM and the like. Note that the hardware configuration is not limited thereto and at least a part of the functions of the respective units of the information processing device (200, 201, 202) may be realized on a dedicated hardware circuit.

The program that is executed in the above-mentioned information processing device (200, 201, 202) may be configured to be provided by being recorded in a recording medium that can be read by a computer, such as a compact disc read only memory (CD-ROM), a flexible disk (FD), a CD recordable (CD-R), or a digital versatile disk (DVD), in a format that can be installed or a file that can be executed.

The program that is executed in the above-mentioned information processing device (200, 201, 202) may be configured to be provided by being stored on a computer connected to a network such as the Internet and being downloaded through the network. Alternatively, the program that is executed in the above-mentioned information processing device (200, 201, 202) may be configured to be provided or distributed through the network such as the Internet.

The embodiment exhibits an advantageous effect that the configuration for detecting global information such as a viewer's position can be realized at low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a first acquiring circuit that acquires first information to be used for detecting whether a viewer is present around a display circuit displaying an image from a first detector that detects the first information;
   a second acquiring circuit that acquires second information to be used for recognizing an instruction action to the image displayed by the display circuit from a second detector that detects the second information; and
   a deciding circuit that decides a recognition method of the instruction action by using the second information, based on the first information acquired by the first acquiring circuit; wherein
   the deciding circuit includes
      a detecting circuit that detects whether a viewer is present around the display circuit by using the first information acquired by the first acquiring circuit, and
      a recognizing circuit that recognizes the instruction action by using the second information acquired by the second acquiring circuit,
   the information processing device further comprises a display control circuit that controls the image displayed by the display circuit in accordance with a processing result by the deciding circuit, and
   the deciding circuit further includes a load ratio setting circuit that sets a load ratio between processing of detecting whether the viewer is present around the display circuit and processing of recognizing the instruction action variably in accordance with a position of the viewer detected by the detecting circuit.

2. The information processing device according to claim 1, wherein the deciding circuit further includes a determining circuit that determines whether recognition of the instruction action is executable in accordance with a position of the viewer detected by the detecting circuit.

3. The information processing device according to claim 1, wherein the deciding circuit further includes a parameter setting circuit that sets a parameter to be used for recognizing the instruction action by the recognizing circuit variably in accordance with a position of the viewer detected by the detecting circuit.

4. The information processing device according to claim 2, wherein when the recognizing circuit recognizes the instruction action, even if the detecting circuit detects a new viewer around the display circuit, the display control circuit does not perform control of the image displayed by the display circuit in accordance with a position of the new viewer.

5. The information processing device according to claim 4, wherein when the recognizing circuit does not recognize the instruction action, the display control circuit performs brightness control of changing brightness of the image displayed by the display circuit in accordance with the position of the viewer detected by the detecting circuit.

6. The information processing device according to claim 1, wherein the display circuit is an image projecting device that projects an image onto a projection target.

7. A system including a display device that displays an image, and an information processing device connected to the display device, comprising:
- a first acquiring circuit that acquires first information to be used for detecting whether a viewer is present around the display device from a first detector that detects the first information;
- a second acquiring circuit that acquires second information to be used for recognizing an instruction action to the image displayed by the display device from a second detector that detects the second information; and
- a deciding circuit that decides a recognition method of the instruction action by using the second information, based on the first information acquired by the first acquiring circuit, the deciding circuit includes
- a detecting circuit that detects whether a viewer is present around the display device by using the first information acquired by the first acquiring circuit; and
- a recognizing circuit that recognizes the instruction action by using the second information acquired by the second acquiring circuit, the information processing device further comprises a display control circuit that controls the image displayed by the display device in accordance with a processing result by the deciding circuit, and the deciding circuit further includes a load ratio setting circuit that sets a load ratio between processing of detecting whether the viewer is present around the display device and processing of recognizing the instruction action variably in accordance with a position of the viewer detected by the detecting circuit.

8. The system according to claim 7, wherein the deciding circuit further includes a determining circuit that determines whether recognition of the instruction action is executable in accordance with a position of the viewer detected by the detecting circuit.

9. The system according to claim 7, wherein the deciding circuit further includes a parameter setting circuit that sets a parameter to be used for recognizing the instruction action by the recognizing circuit variably in accordance with a position of the viewer detected by the detecting circuit.

10. The system according to claim 8, wherein when the recognizing circuit recognizes the instruction action, even if the detecting circuit detects a new viewer around the display device, the display control circuit does not perform control of the image displayed by the display device in accordance with a position of the new viewer.

11. The system according to claim 10, wherein when the recognizing circuit does not recognize the instruction action, the display control circuit performs brightness control of changing brightness of the image displayed by the display device in accordance with the position of the viewer detected by the detecting circuit.

12. The system according to claim 7, wherein the display device is an image projecting device that projects an image onto a projection target.

13. An information processing method comprising:
- acquiring, with a circuit, first information to be used for detecting whether a viewer is present around a display circuit displaying an image from a first detector that detects the first information;
- acquiring, with the circuit, second information to be used for recognizing an instruction action to the image displayed by the display circuit from a second detector that detects the second information;
- deciding, with the circuit, a recognition method of the instruction action by using the second information, based on the first information acquired at the acquiring of the first information;
- detecting whether a viewer is present around the display circuit by using the first information acquired by the circuit;
- recognizing the instruction action by using the second information acquired by the circuit;
- controlling the image displayed by the display circuit in accordance with a processing result; and
- setting a load ratio between processing of detecting whether the viewer is present around the display circuit and processing of recognizing the instruction action variably in accordance with a position of the viewer detected by the circuit.

* * * * *